United States Patent [19]
Freitas et al.

[11] Patent Number: 6,130,795
[45] Date of Patent: Oct. 10, 2000

[54] METHOD AND APPARATUS TO SENSE AND REPORT CONNECTION INTEGRITY OF A DIFFERENTIAL ECL TRANSMISSION LINE HAVING PROPER PARALLEL TERMINATION

[75] Inventors: David Anthony Freitas, Morgan Hill; Kevin Roy Vannorsdel, San Jose, both of Calif.

[73] Assignee: International Business Machines Corporation, Armonk, N.Y.

[21] Appl. No.: 09/073,117

[22] Filed: May 5, 1998

[51] Int. Cl.[7] ........................................... G11B 5/02
[52] U.S. Cl. .................................. 360/67; 360/46
[58] Field of Search ............................... 340/652; 326/30; 324/512, 212, 226; 327/77; 360/31, 39, 46, 67, 68, 53; 369/53, 55

[56] References Cited

U.S. PATENT DOCUMENTS

| | | |
|---|---|---|
| 4,086,570 | 4/1978 | Wakasa et al. . |
| 4,203,137 | 5/1980 | Beck et al. ................................. 360/31 |
| 4,622,599 | 11/1986 | Norton, Jr. ................................. 360/31 |
| 4,697,099 | 9/1987 | Bonaccio . |
| 4,748,652 | 5/1988 | Nagai et al. . |
| 4,782,300 | 11/1988 | Bonaccio et al. . |
| 5,087,884 | 2/1992 | Brannon ................................... 324/523 |
| 5,488,306 | 1/1996 | Bonaccio . |
| 5,729,208 | 3/1998 | Ogiwara ................................. 360/46 X |
| 5,982,568 | 11/1999 | Yamamoto et al. ................... 360/53 X |
| 6,014,281 | 1/2000 | Contreras ................................... 360/67 |

*Primary Examiner*—Alan T. Faber
*Attorney, Agent, or Firm*—Altera Law Group, LLC

[57] ABSTRACT

An apparatus and method for sensing and reporting connection integrity of a differential transmission line having proper parallel termination is constructed by generating an error signal which indicates that one or both differential input lines are open. The error signal is generated using a voltage comparator having a first and second input in which these inputs are coupled to the first and second ECL signal lines. The first and second input lines are also coupled to a supply voltage by a first and second dynamic impedance such that the input is pulled high when the signal lines are open. The comparator generates an error signal when the input voltages are greater than voltages normally seen on the signal lines indicating the presence of a open transmission line.

17 Claims, 5 Drawing Sheets

METHOD AND APPARATUS TO SENSE AND REPORT CONNECTION INTEGRITY OF A DIFFERENTIAL ECL TRANSMISSION LINE HAVING PROPER PARALLEL TERMINATION

BACKGROUND OF THE INVENTION

1. Field of the Invention

This invention relates in general to a method and apparatus to sense and report proper transmission line termination, and more particularly to a method and apparatus to sense and report the connection integrity of a differential ECL transmission line having proper parallel termination.

2. Description of Related Art

In recent high density Direct Access Storage Devices (DASD), the data to be written to a disk is transmitted from a data channel circuit to an arm electronics (AE) module through a differential transmission line. The channel chip typically drives this transmission line with a differential Positive Emitter Coupled Logic (PECL) driver circuit. The output stage of this circuit typically uses an actively biased emitter follower configuration.

Transmission lines must be terminated to minimize signal reflections which can cause power dissipation in the transmitted signal. Thus, signal termination circuitry provides a terminating impedance for the signal traveling down the transmission line. Ideally, this termination impedance should be connected to the end of the transmission line in such a way that any signal traveling down the line sees no change in impedance when it reaches the end of the signal path. That is, the termination impedance should be equal to the characteristic impedance of the transmission line ($Z_o$). Maintaining this sort of impedance characteristic over the entire signal path will minimize signal reflections. This arrangement allows high bandwidth data to be transmitted with virtually no signal corruption.

One effective way to terminate a differential transmission line to minimize signal reflections is to place an impedance matching device between the two differential signal wires at the end of the signal path. This impedance value is typically designed to possess an impedance equal to the differential impedance of the transmission line itself.

Because this termination impedance effectively connects the two wires of the transmission line, it becomes difficult for the standard write safety circuits to always detect certain types of faults on this channel. For example, faults such as one wire open and both wires open are difficult to detect.

In applications where a matching termination is not required, such as applications using lower data rates, sub-optimal termination schemes have been employed in order to achieve other desirable features. A "single ended" termination approach has been used previously for two reasons: the proper bias for emitter followers having open emitter type outputs were provided and open interconnects could be easily detected.

FIG. 1 illustrates a circuit diagram 100 of a data channel 101 coupled to an AE module 103 via an interconnect 102, wherein two prior art termination methods 150, 160 are shown. In FIG. 1, a differential ECL transmission line 104 is shown that includes terminating impedance 133 at a receiver inputs 131 and 132. Impedances 140, 141 are coupled to ground on each conductor to provide the bias current to the emitter followers 112, 113 in the data channel circuits 101. As shown in FIG. 1, the data channel circuit modules include open emitter type outputs 112, 113. Connecting these impedances as shown in FIG. 1 makes detecting open interconnects possible. Since the impedance at the input of the AE module 103 would pull the voltage on an open line to ground, the AE module 103 would sense an invalid voltage level at one or both of its inputs 145, 146 and could post an error indicating an open interconnect condition.

As data rates increase, this sub-optimal termination scheme is no longer adequate and one must more accurately match the termination impedance to the transmission line. FIG. 1 shows a second termination impedance transmission line matching method 160. This termination impedance matching method 160 is accomplished by connecting an impedance 142 across the two conductors 131, 132 of the line as shown in FIG. 1.

While this impedance 142 can provide perfect signal termination, it makes it difficult to reliably detect an open conductor in the interconnect. This result can be understood by recognizing that the two conductors 131, 132 are now tied together by a relatively low impedance. If one conductor breaks, the signal on the driven input pin will simply couple through the termination to the other pin. This condition will cause both AE inputs 145, 146 to see nearly the same signal. The receiver will not be able to properly interpret this signal and will provide an unpredictable output to the rest of the circuitry in the AE module 103.

It can be seen that there is a need for a method for sensing and reporting the status of connection integrity for differential ECL transmission lines having proper parallel termination.

It can also be seen that there is a need for providing proper termination impedance needed to support increasingly higher data transmission speeds.

SUMMARY OF THE INVENTION

To overcome the limitations in the prior art described above, and to overcome other limitations that will become apparent upon reading and understanding the present specification, the present invention discloses a method and apparatus to sense and report the connection integrity of a differential ECL transmission line.

The present invention solves the above-described problems by providing an error signal indicating that one or both signal lines are open.

A system in accordance with the principles of the present invention includes an impedance matching device coupled to the first and second signal line, a transition detecting device, coupled to the impedance matching device, for detecting a single open wire condition when no signal transitions are detected at the output of the receiver, and a threshold detector, coupled to the first and second signal lines, for detecting a both open wire condition when the a characteristic of the first and second signal lines exceed a predetermined threshold.

Other embodiments of a system in accordance with the principles of the invention may include alternative or optional additional aspects. One such aspect of the present invention is that the impedance matching device further comprises a terminating impedance coupled between the first and second signal lines.

Another aspect of the present invention is that the threshold detector further includes a first dynamic impedance coupled to the first signal line signal for pulling the first signal line high when the first signal line is open, a second dynamic impedance coupled to the second signal for pulling the second signal line high where the second transmission line is open, and a comparator coupled to the first and second signal lines for generating an error signal indicating that both the first and the second signal lines are open.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for sensing and reporting the current connection integrity of a differential ECL transmission line having proper parallel termination.

Figure 1:
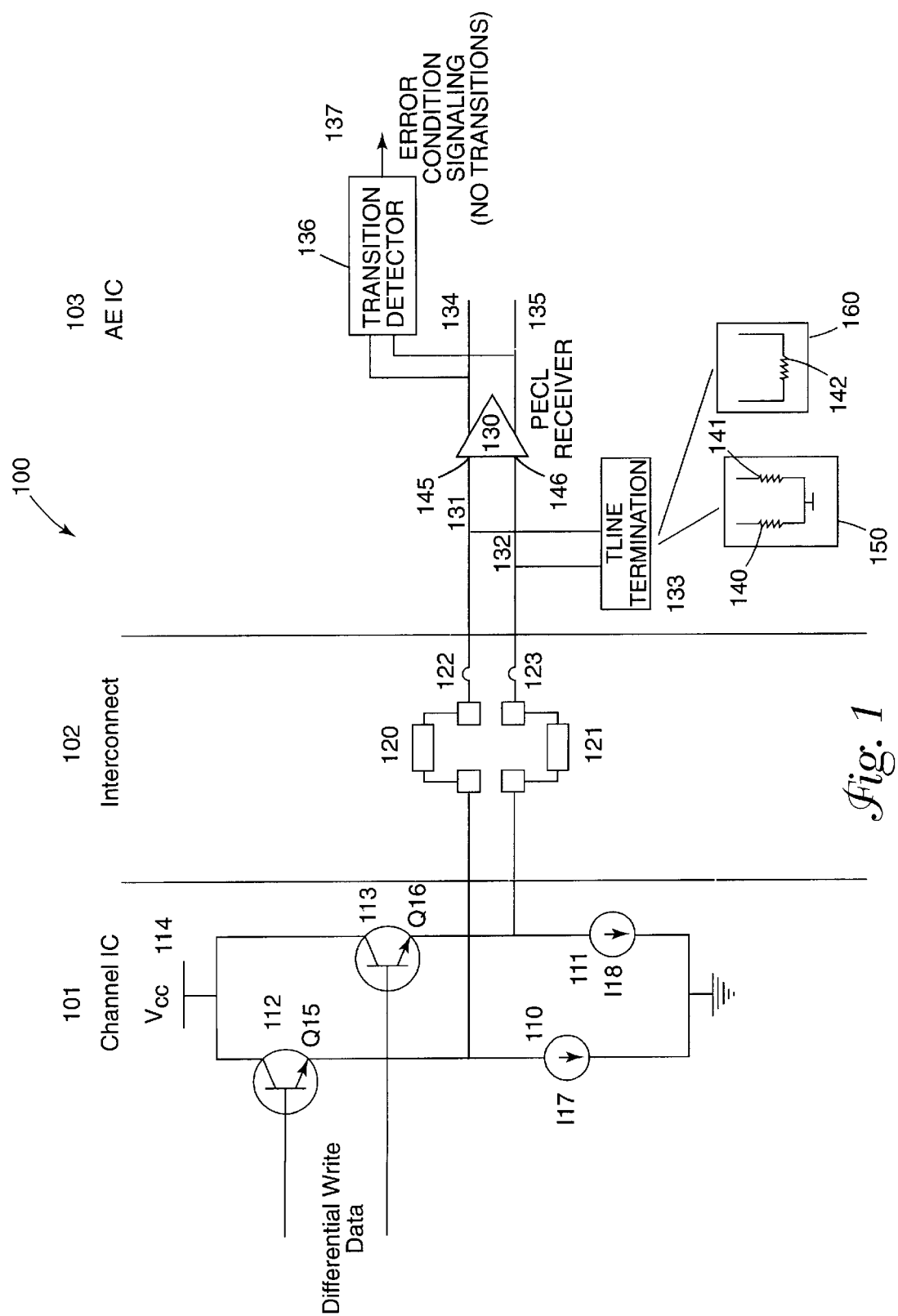
FIG. 1 illustrates a typical differential signal connection circuit with various termination methods.
Figure 2:
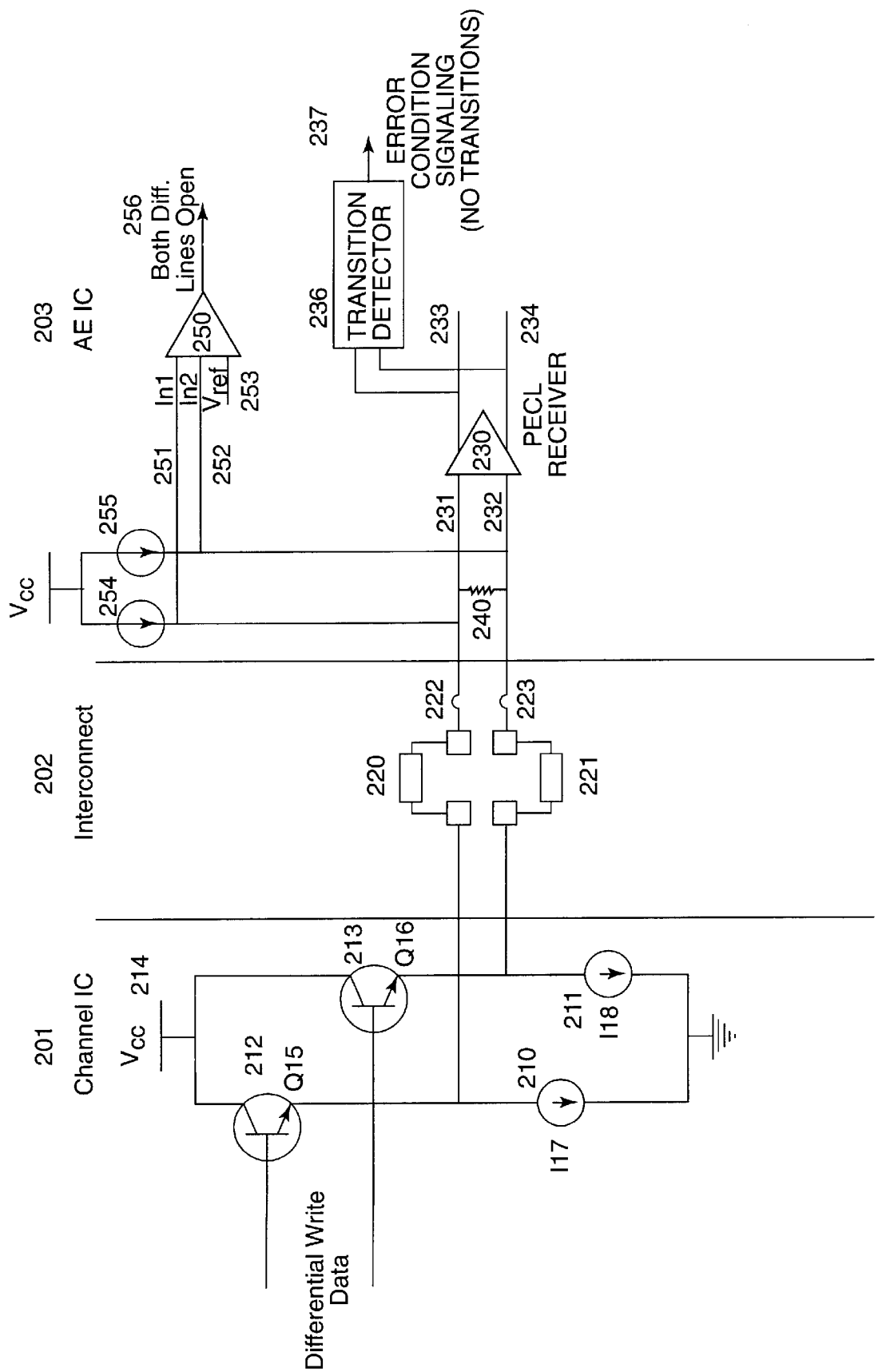
FIG. 2 illustrates an example embodiment of the present invention for a differential signal connection circuit including connection integrity circuitry.

FIG. 2 illustrates the driving circuitry in the data channel circuit and the receiving circuitry in the arm electronic (AE) circuit. The driving circuitry of the data channel 201 is shown in FIG. 2. The data channel 201 includes two emitter followers 212, 213 biased by two current sources 210, 211. The two emitter followers 212, 213 provide a high input impedance to the data channel 201 and deliver a differential "Positive Emitter Coupled Logic" (PECL) signal to the transmission line interconnect 202.

Data that is to be written to a disk is transmitted from the data channel chip 201 to the AE module 203 through a differential transmission line interconnect 202. In FIG. 2, the differential transmission line interconnect 202 is represented by transmission line conductors 220, 221. The differential transmission line interconnect 202 has a predetermined characteristic impedance ($Z_o$). However, the differential transmission line interconnect 202 may experience a fault condition, wherein one or both of the transmission line conductors 220, 221 break thereby creating an open circuit between the data channel 201 and the AE module 203. The possibility of one or both of the transmission line conductors 220, 221 breaking is represented in FIG. 2 by the "fusible link" symbols 222, 223.

Coupled to the other end of the differential transmission line interconnect 202 is the AE module 203. The AE module 203 includes two parts: the transmission line termination 133 and the PECL receiver/buffer circuitry 230. The transmission line termination 133 is always in place to properly terminate the differential transmission line interconnect 202. In some cases, this termination also provides additional bias for the channel emitter followers 212, 213 described above. The PECL receiver/buffer circuitry 230 processes the received PECL signal such that the received signal can be used in other parts of the AE module 203, e.g., the write driver (not shown).

According to one embodiment of the present invention, two dynamic impedances 254, 255 and a voltage comparator 250 are added to the AE module 203. In the embodiment illustrated in FIG. 2, the dynamic impedances 254, 255 are modeled as 1 mA current sources. The voltage comparator 250 has three inputs: a first input 251, a second input 252, and a reference voltage input 253. The comparator circuit 250 compares the voltage on both the first 251 and second input 252 lines to the reference voltage $V_{ref}$ at reference voltage input 253. The reference voltage, $V_{ref}$, is set just above the highest valid PECL level present on the transmission lines 220, 221 in normal operation. For example, the reference voltage $V_{ref}$ may be approximately +5 volts.

During normal operation, the two current sources 254, 255 provide a constant current that travels back through the transmission lines 220, 221 towards the data channel 201. This current is absorbed by the bias current sources 210, 211. All signal voltages on the transmission lines 220, 221 are then determined by the respective channel emitter follower transistors 212, 213. Therefore, the PECL receiver/buffer 230 in the AE module 203 has normal PECL signals at inputs 231 and 232 and supplies valid transitions to the write driver (not shown) via outputs 233 and 234. Since the PECL receiver 230 is a differential circuit, its outputs 233, 234 will not be constant and the transition detector will provide a "transition" signal provided at the output 337, which indicates that an error condition is not present. Further, since the inputs 251 and 252 are below the reference voltage $V_{ref}$ at the voltage reference input 253 the output 256 of the comparator 250 will be low thereby posting no error condition.

Figure 3:
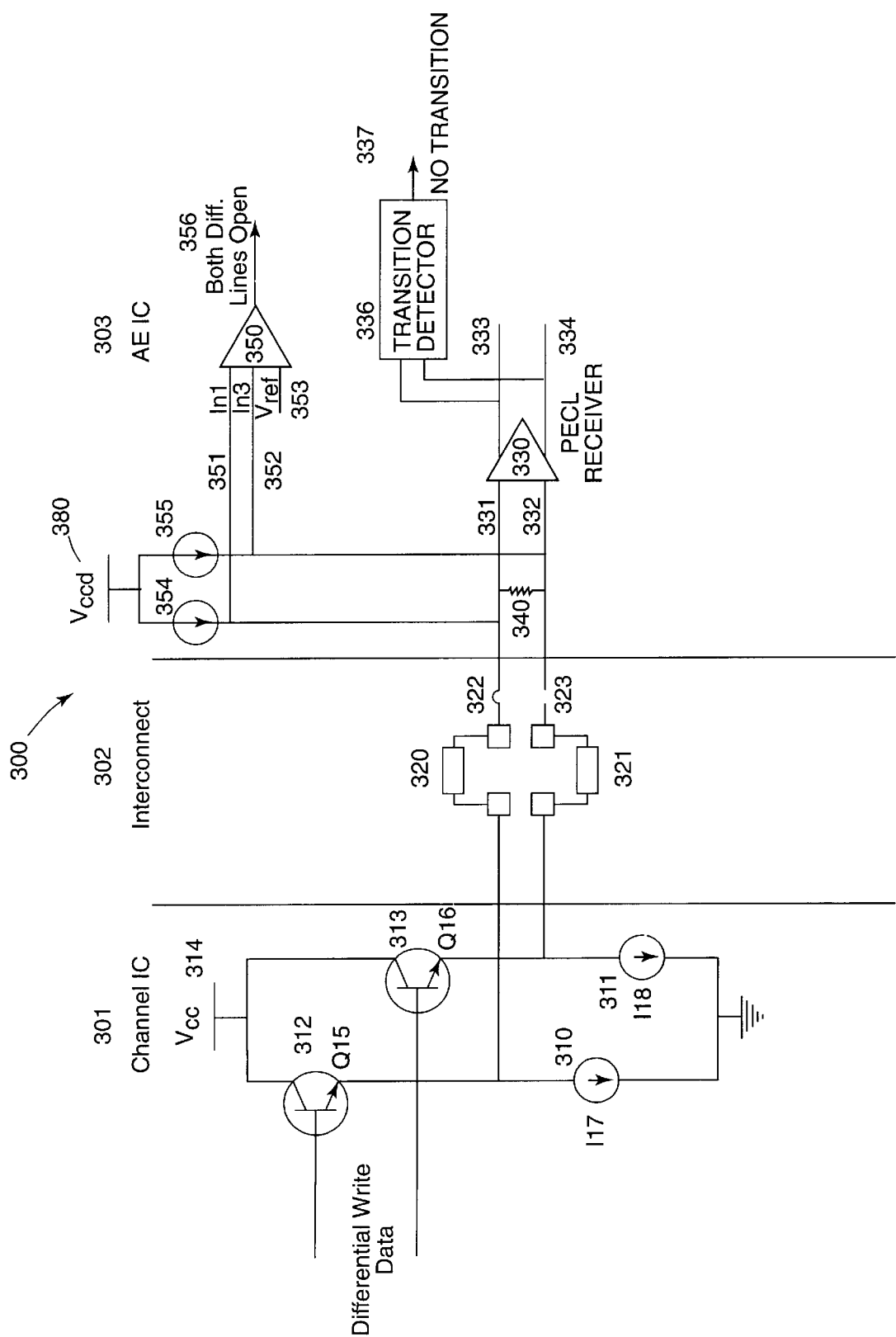
FIG. 3 illustrates an example embodiment according to the present invention wherein one of the differential signal lines is an open connection.

An operational example 300 according to the present invention where one conductor of the differential signal pair is open circuited 323 is shown in FIG. 3. In this case, the current introduced by the first dynamic impedance 355 can no longer travel back down the transmission line to bias current source 311 in the normal fashion due to the "open" 323 in one of the differential signal paths. Instead, this current will be forced through the terminating impedance 340. This current will combine with the current from the second dynamic impedance 354 and will flow back to the data channel current source 310. This will force a constant voltage drop across the terminating impedance 340. Since the PECL receiver 330 is a differential circuit, its outputs 333, 334 will be constant. This will be recognized by the "no transition" signal provided at the output 337 of the transition detector 336 that is recognized as an error condition.

Figure 4:
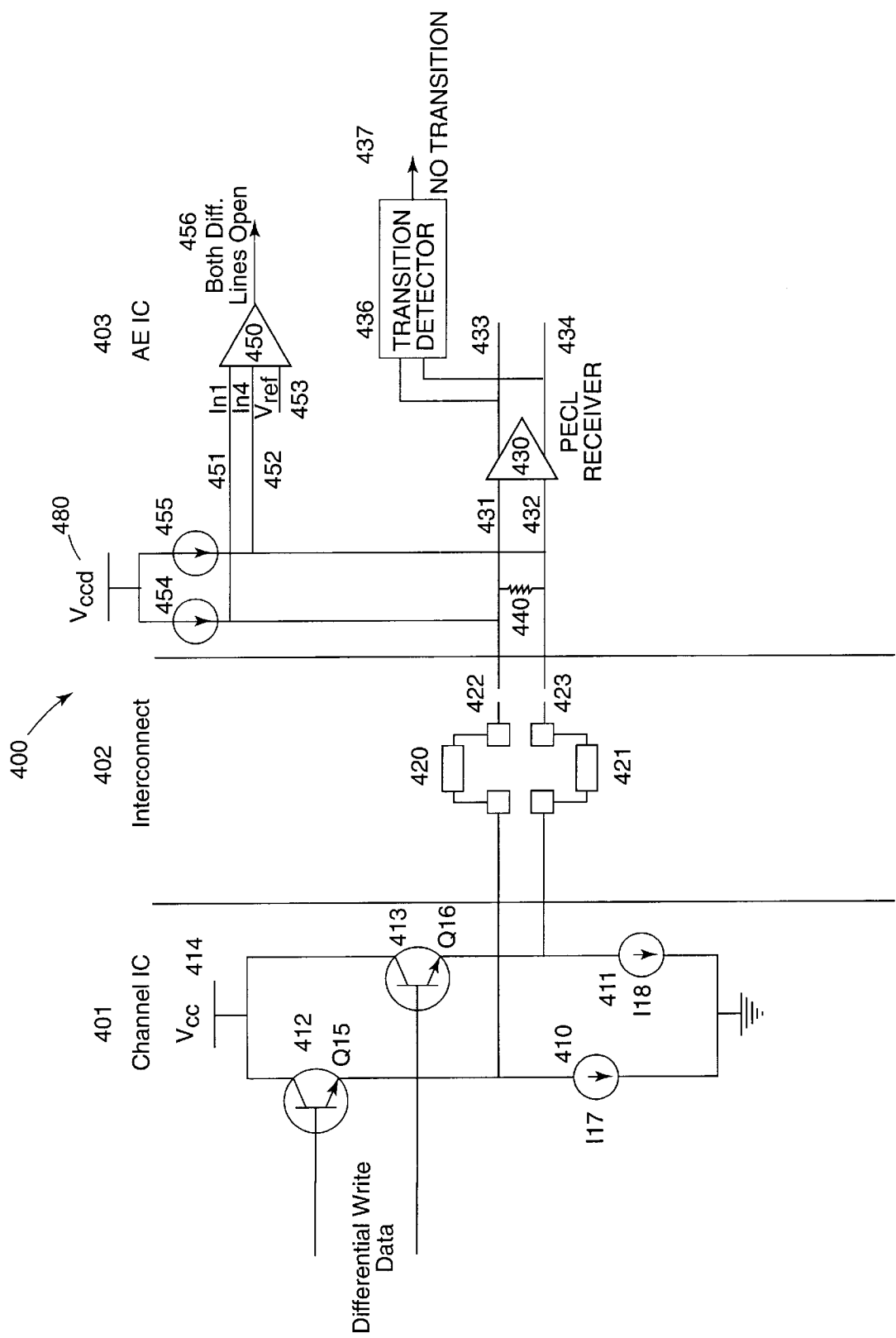
FIG. 4 illustrates an example embodiment according to the present invention wherein both of the differential signal lines are open connections.

FIG. 4 illustrates the operational example 400 according to the present invention where both conductors 420, 421 in the transmission line are open 423, 433. In this case, there is no place for the current introduced by dynamic impedances 454, 455 to flow. The voltage on the first input line 451 and the second input line 452 of the comparator 450 will rise and eventually be driven to a voltage very near the supply rail, i.e., $V_{ccd}$ 480. This abnormally high voltage will be sensed by the comparator which will report the error as "Both Lines Open" 456. This error signal can be used by other control logic associated with the channel operation to take appropriate error correction steps associated with processing this error condition.

Figure 5:
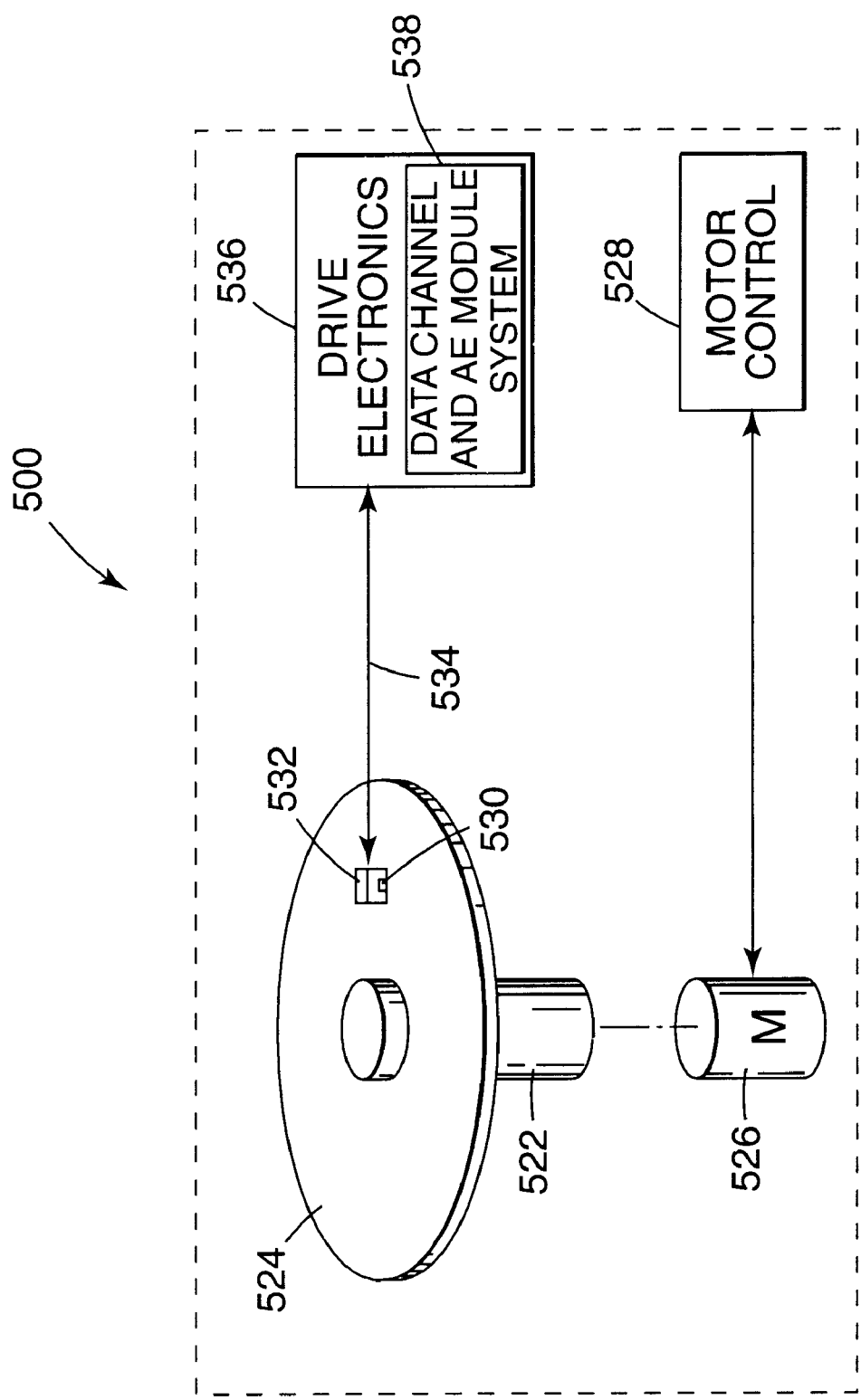
FIG. 5 illustrates a magnetic storage device according to the present invention.

FIG. 5 illustrates a magnetic storage device 500 according to the present invention. The drive 500 includes a spindle 522 which supports and rotates a magnetic recording media 524, e.g. disks. The spindle 522 is rotated by a motor 526 which is controlled by drive controls 528. A magnetic sensor 530, e.g., an MR or GMR head, is mounted on a slider 532 which in turn is supported by a suspension and actuator arm (not shown). Data signals 534 are passed between the slider 532 and the drive electronics 536 as data to be written to the disk 524 or data that has been sensed on the disk 524 by the sensor 530 and as control signals for positioning the slider by the actuator arm (not shown). When the magnetic recording media 524 is rotated by the motor 526, air is moved by the surface of the magnetic recording media 524, causing the slider 532 to ride on a cushion of air (an air bearing) slightly above the surface, in the order of 0.075 microns. The magnetic sensor 530 is then employed for writing information to multiple circular tracks on the surface of the magnetic recording media 524 as well as reading information therefrom. Thus, these information signals 534 include data signals and servo signals for moving the slider 532 to various tracks are processed by the drive electronics 536. The drive electronics 536 includes a data channel/AE module system 538 for writing data to the disk 524 and for sensing and reporting connection integrity of the differential transmission line between the data channel and AE module as described above.

In summary, a method and apparatus to sense and report the connection integrity of a differential ECL transmission line having proper parallel termination has been described. The ability to sense both one conductor open and both conductor open conditions is provided by detecting the single open wire condition when no signal transitions are detected at the output of the PECL receiver and detecting a both open wire condition when the voltage on the differential input lines exceed a predetermined threshold.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for sensing and reporting proper termination of a differential signal pair in a data channel, having a first and second signal line connecting to a receiver/buffer circuit, comprising:
   a matching impedance device coupled to the first and second signal line;
   a transition detecting device, coupled to the output of the receiver/buffer circuit, for detecting a single open wire condition when no signal transitions are detected at the output of the receiver; and
   a threshold detector, coupled to the first and second signal lines before the receiver/buffer circuit, for detecting a both open wire condition when the a characteristic of the first and second signal lines exceed a predetermined threshold.

2. The apparatus of claim 1 wherein the impedance matching device further comprises a terminating impedance device coupled between the first and second signal line.

3. The apparatus of claim 2 wherein the threshold detector further comprises:
   a first dynamic impedance device coupled to the first signal line signal for pulling the first signal line high when the first signal line is open;
   a second dynamic impedance device coupled to the second signal line for pulling the second signal line high when the second transmission line is open; and
   a voltage comparator coupled to the first and second signal lines for generating an error signal when both the first and the second signal lines are open.

4. The apparatus of claim 1 wherein the threshold detector further comprises:
   a first dynamic impedance device coupled to the first signal line signal for pulling the first signal line high when the first signal line is open;
   a second dynamic impedance device coupled to the second signal line for pulling the second signal line high when the second transmission line is open; and
   a voltage comparator coupled to the first and second signal lines for generating an error signal when both the first and the second signal lines are open.

5. The apparatus of claim 4, wherein the voltage comparator further comprises a first input, a second input, and a reference voltage input, wherein the first input is coupled to the first signal line, the second input is coupled to the second signal line, and the reference voltage input is coupled to a reference voltage.

6. The apparatus of claim 5, wherein the first and the second dynamic impedances are current sources.

7. The apparatus of claim 5, wherein the reference voltage is set to a voltage greater than a normal highest voltage level of the first and second signal lines.

8. The apparatus of claim 7, wherein the comparator compares the first and the second inputs to the reference voltage.

9. The apparatus of claim 8, wherein the comparator asserts the error signal when both the voltage on first input and the second input are greater than the reference voltage.

10. The apparatus of claim 1, wherein the impedance matching device has an impedance equal to the impedance of the first and second signal lines.

11. A method for sensing and reporting proper termination of a differential signal pair having a first signal line and a second signal line for connecting a differential transmission line to a receiver/buffer circuit, the method comprising the steps of:
   connecting a terminating resistor between the first and second signal wires;
   connecting a first input of a three input comparator to the first signal line and a first current source before the receiver/buffer circuit;
   connecting a second input of the comparator to the second signal line and a second current source before the receiver/buffer circuit;
   detecting a single open wire condition with a threshold detector when no signal transitions are detected at the output of the receiver; and
   detecting and reporting a both open wire condition when the comparator output is asserted in response to a voltage on both the first signal line and the second line being greater than reference voltage.

12. The method of claim 11, wherein the step of identifying a both open condition further comprises the step of comparing a reference voltage to a voltage on the first and second signal lines.

13. The method of claim 11, wherein the step of coupling an impedance matching device across the first and second signal lines further comprises the step of coupling a terminating resistor having an impedance equal to the impedance of the first and second signal lines across the first and second signal lines.

14. The method of claim 11, wherein the step of identifying a both open condition further comprises the steps of pulling the first signal line high when the first signal line is open, pulling the second signal line high when the second transmission line is open and generating an error signal when both the first and the second signal lines are open.

15. A data storage device, comprising:

a data recording media;

a motor for moving the data recording media;

a data sensor, operatively coupled to the data recording device, for sensing and writing data signals on the data recording media; and a signal processing device, operatively coupled to the data sensor, for processing the data signal, the signal processing device including a differential signal pair in a data channel, the differential signal pair including a first and second signal line connecting to a receiver/buffer circuit, the signal processing device further comprising:

a matching impedance device coupled to the first and second signal line;

a transition detecting device, coupled to the output of the receiver/buffer circuit, for detecting a single open wire condition when no signal transitions are detected at the output of the receiver; and a threshold detector, coupled to the first and second signal lines before the receiver/buffer circuit, for detecting a both open wire condition when the a characteristic of the first and second signal lines exceed a predetermined threshold.

16. The data storage device of claim 15 wherein the impedance matching device further comprises a terminating impedance device coupled between the first and second signal line.

17. The data storage device of claim 15 wherein the threshold detector further comprises:

a first dynamic impedance device coupled to the first signal line signal for pulling the first signal line high when the first signal line is open;

a second dynamic impedance device coupled to the second signal line for pulling the second signal line high when the second transmission line is open; and a voltage comparator coupled to the first and second signal lines for generating an error signal when both the first and the second signal lines are open.

* * * * *

UNITED STATES PATENT AND TRADEMARK OFFICE
CERTIFICATE OF CORRECTION

PATENT NO. : 6,130,795
DATED : October 10, 2000
INVENTOR(S) : Freitas et al.

It is certified that error appears in the above-identified patent and that said Letters Patent is hereby corrected as shown below:

Title page,
ABSTRACT, line 13, replace "a" with -- an --;

Column 2,
Line 54, delete "a" after "the";

Column 6,
Line 1, delete "a" after "the";

Column 8,
Line 10, delete "a" after first "the".

Signed and Sealed this

Fourth Day of June, 2002

Attest:

JAMES E. ROGAN
Attesting Officer      Director of the United States Patent and Trademark Office